United States Patent
Chen

(10) Patent No.: US 11,269,243 B2
(45) Date of Patent: Mar. 8, 2022

(54) OPTICAL MODULE AND PROJECTION DEVICE

(71) Applicant: Coretronic Corporation, Hsin-Chu (TW)

(72) Inventor: Wei-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/241,085

(22) Filed: Apr. 27, 2021

(65) Prior Publication Data

US 2021/0333695 A1  Oct. 28, 2021

(30) Foreign Application Priority Data

Apr. 27, 2020 (CN) .......................... 202020658785.2

(51) Int. Cl.
   *G03B 21/14* (2006.01)
   *G03B 21/64* (2006.01)
   *G03B 21/43* (2006.01)

(52) U.S. Cl.
   CPC ........... *G03B 21/142* (2013.01); *G03B 21/43* (2013.01); *G03B 21/64* (2013.01)

(58) Field of Classification Search
   None
   See application file for complete search history.

(56) References Cited

U.S. PATENT DOCUMENTS

2020/0301118 A1* 9/2020 Lin .................... H02K 41/0356

FOREIGN PATENT DOCUMENTS

| CN | 106160270 | 11/2016 |
|----|-----------|---------|
| CN | 109856898 | 6/2019  |

* cited by examiner

*Primary Examiner* — Michelle M Iacoletti
*Assistant Examiner* — Danell L Owens
(74) *Attorney, Agent, or Firm* — JCIPRNET

(57) ABSTRACT

An optical module, including a first frame, a second frames, an optical element, a first driving module, and a second driving module, is provided. The first frame is connected to a base. The second frame is connected to and located in the first frame. The optical element is disposed in the second frame. The first driving module is disposed between the base and the first frame to drive the first frame to oscillate around a first rotating axis. The second driving module is disposed between the first and second frames to drive the second frame to oscillate around a second rotating axis. The first and second rotating axes are perpendicular to an optical axis of the optical element, and not parallel. An overall dimension of the second driving module is less than that of the first driving module. A projection device having the optical module is also provided.

16 Claims, 4 Drawing Sheets

OPTICAL MODULE AND PROJECTION DEVICE

CROSS-REFERENCE TO RELATED APPLICATION

This application claims the priority benefit of China application serial no. 202020658785.2, filed on Apr. 27, 2020. The entirety of the above-mentioned patent application is hereby incorporated by reference herein and made a part of this specification.

BACKGROUND OF THE INVENTION

1. Field of the Invention

The disclosure relates to an optical module and a projection device, and in particular to an optical module including an oscillatable frame and a projection device with the optical module.

2. Description of Related Art

A projection device is a display device for generating a picture. The imaging principle of the projection device is to convert an illuminating beam generated by a light source into an image beam by means of a light valve, and then project the image beam onto a screen or a wall by means of a projection lens.

The resolution of an image converted by the light valve has gradually failed to meet the market demand. In order to further increase the resolution of the image, a high-resolution light valve can be used in the projection device, but the cost of the projection device will be high. In addition, in some projection devices, optical modules capable of realizing optical vibration can be additionally arranged so as to further improve the resolution of the image converted by the light valve. The optical module generally includes an outer frame, an inner frame and a light-transmitting plate arranged on the inner frame, and two driving modules are used to respectively drive the outer frame and the inner frame to oscillate in a reciprocating manner around different axes, so as to conduct the optical vibration. The two driving modules generally have the same dimension. However, the weight of the inner frame is less than the weight of the outer frame, and the inner frame and the outer frame are made of the same material. Therefore, driven force required by the inner frame is less than driven force required by the outer frame, and thus the same dimension of a driving module of the inner frame and a driving module of the outer frame actually increases the volume of an overall structure of the optical module.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The disclosure provides an optical module and a projection device that are capable of reducing an overall volume of the optical module.

Other objectives and advantages of the disclosure can be further understood from technical features disclosed in the disclosure.

In order to achieve one, parts or all of the above objectives or other objectives, an embodiment of the disclosure provides an optical module, including a first frame, a second frame, an optical element, a first driving module and a second driving module. The first frame is connected to a base. The second frame is connected to the first frame and located in the first frame. The optical element is disposed in the second frame. The first driving module is disposed between the base and the first frame, and configured to drive the first frame to oscillate around a first rotating axis. The second driving module is disposed between the first frame and the second frame, and configured to drive the second frame to oscillate around a second rotating axis. The first rotating axis and the second rotating axis are perpendicular to an optical axis of the optical element. The first rotating axis is not parallel to the second rotating axis. An overall dimension of the second driving module is less than an overall dimension of the first driving module.

In order to achieve one, parts or all of the above objectives or other objectives, an embodiment of the disclosure provides a projection device, including a light source, a light valve, a projection lens and an optical module. The light source is configured to provide an illuminating beam. The light valve is configured to convert the illuminating beam into an image beam. The projection lens is configured to project the image beam. The optical module is disposed between the light valve and the projection lens, and includes a first frame, a second frame, an optical element, a first driving module and a second driving module. The first frame is connected to a base. The second frame is connected to the first frame and located in the first frame. The optical element is disposed in the second frame and located on a transmission path of the image beam. The first driving module is disposed between the base and the first frame, and configured to drive the first frame to oscillate around a first rotating axis. The second driving module is disposed between the first frame and the second frame, and configured to drive the second frame to oscillate around a second rotating axis. The first rotating axis and the second rotating axis are perpendicular to an optical axis of the optical element. The first rotating axis is not parallel to the second rotating axis. An overall dimension of the second driving module is less than an overall dimension of the first driving module.

Based on the above reasons, the embodiments of the disclosure at least have one of the following advantages or effects. In the optical module of the disclosure, the second driving module with a relatively low demand for driving force adopts a relatively small overall dimension. In this way, increasing of a volume of an overall device due to selecting of a second driving module with power and a volume beyond actual demands can be avoided.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
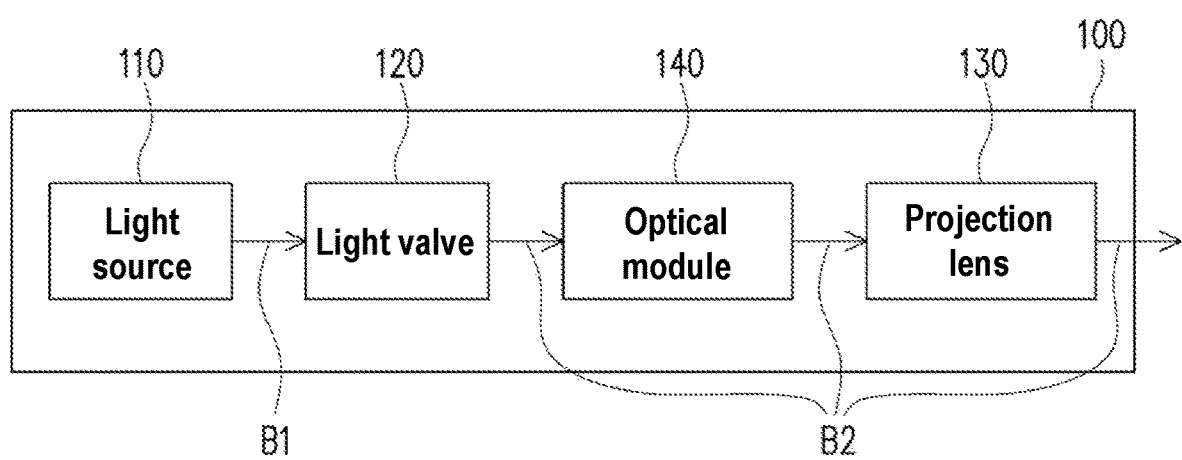
FIG. 1 is a schematic diagram of a projection device of an embodiment of the disclosure.

FIG. 1 is a schematic diagram of a projection device of an embodiment of the disclosure. Referring to FIG. 1, a projection device 100 of the embodiment includes a light source 110, a light valve 120, a projection lens 130 and an optical module 140. The light source 110 is configured to provide an illuminating beam B1. The light valve 120, for example, is a digital micro-mirror device (DMD), a reflective liquid crystal on silicon (LCOS) or a transparent liquid crystal panel. Moreover, the light valve 120 is configured to convert the illuminating beam B1 into an image beam B2. The projection lens 130 is configured to project the image beam B2. The optical module 140 is disposed between the light valve 120 and the projection lens 130, and configured to conduct optical vibration so as to improve a resolution of the image beam B2 converted by the light valve 120.

Figure 2:
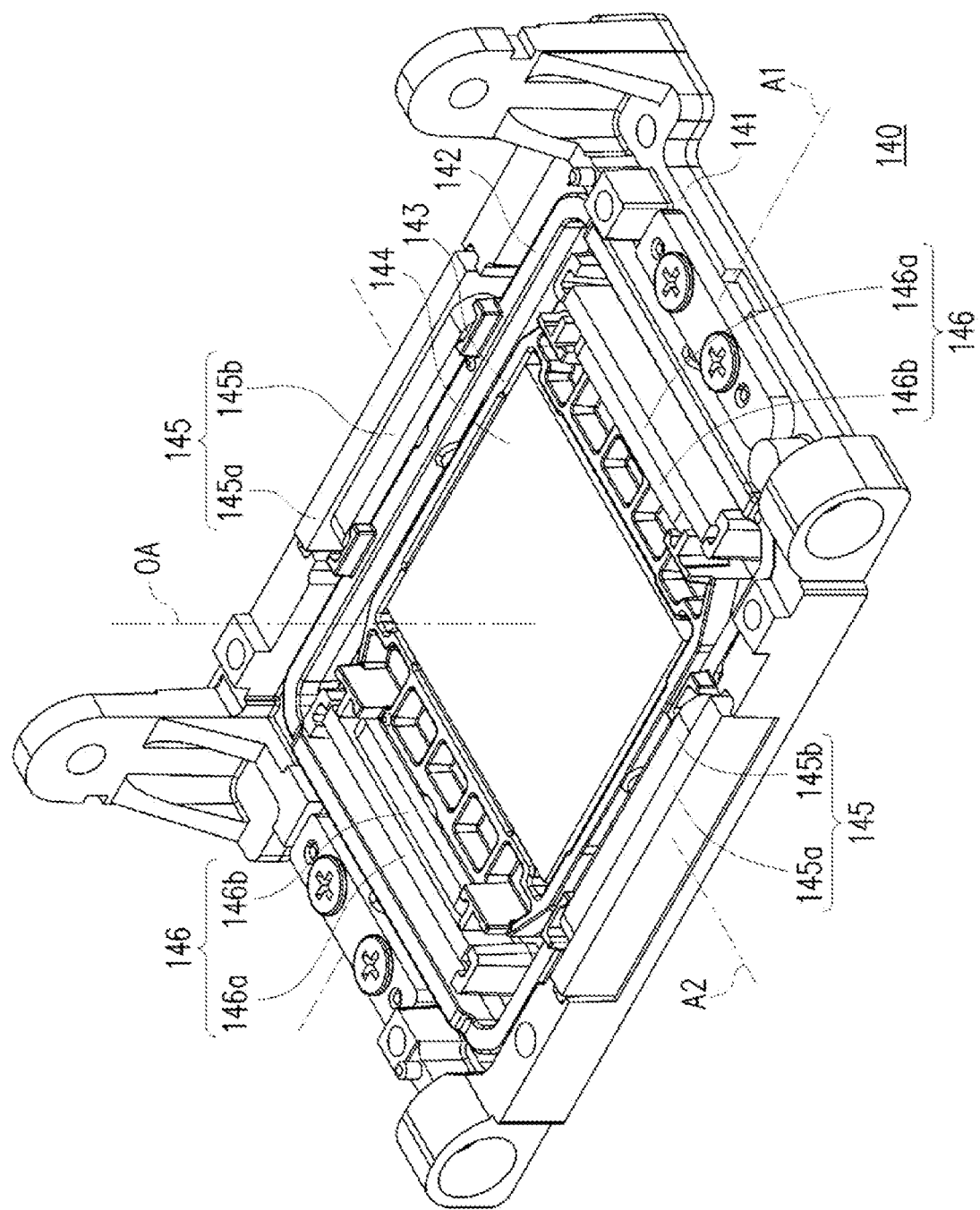
FIG. 2 is a perspective diagram of an optical module of FIG. 1.

FIG. 2 is a perspective diagram of the optical module of FIG. 1. Referring to FIG. 2, the optical module 140 of the embodiment includes a base 141, a first frame 142, a second frame 143, an optical element 144, at least one first driving module 145 (two first driving modules 145 are illustrated) as well as at least one second driving module 146 (two second driving modules 146 are illustrated). The first frame 142 may be regarded as an outer frame and connected to the base 141 by means of a first rotating shaft (not shown). The second frame 143 may be regarded as an inner frame, connected to the first frame 142 by means of a second rotating shaft (not shown) and located in the first frame 142. The optical element 144, for example, is a light-transmitting plate body, and is disposed in the second frame 143 and located on a transmission path of the image beam B2 (illustrated in FIG. 1), so that the image beam B2 penetrates through the optical element 144.

The two first driving modules 145 are disposed on two opposite sides of the first frame 142 respectively, and the two second driving modules 146 are disposed on two opposite sides of the second frame 143 respectively. The two second driving modules 146 are both disposed on a first rotating axis A1, and the two first driving modules 145 are both disposed on a second rotating axis A2. Each of the first driving modules 145 is disposed between the base 141 and the first frame 142. In detail, a part of each of the first driving modules 145 is disposed on the base 141, and the other part of each of the first driving modules 145 is disposed on the first frame 142. Each of the first driving modules 145 is configured to drive the first frame 142 to oscillate in a reciprocating manner around the first rotating axis A1 relative to the base 141. Each of the second driving modules 146 is disposed between the first frame 142 and the second frame 143. A part of each of the second driving modules 146 is disposed on the base 141, and the other part of each of the second driving modules 146 is disposed on the second frame 143. Each of the second driving modules 146 is configured to drive the second frame 143 to oscillate in a reciprocating manner around the second rotating axis A2 relative to the first frame 142 or the base 141. The first rotating axis A1 and the second rotating axis A2 are perpendicular to an optical axis OA of the optical element 144, and the first rotating axis A1 is not parallel to the second rotating axis A2 (the first rotating axis A1 being perpendicular to the second rotating axis A2 is illustrated).

In the embodiment, an overall dimension of the second driving modules 146 is less than an overall dimension of the first driving modules 145. The so-called overall dimension is defined as a volume (length×width×height) roughly occupied by an element. The first frame 142 is an outer frame with a relatively large overall dimension, and the first driving modules 145 drive the first frame 142, the second frame 143 and the optical element 144 to oscillate as a whole. Compared with this, the second frame 143 is an inner frame with a relatively small overall dimension, and the second driving modules 146 drive the second frame 143 and the optical element 144 to oscillate without driving the first frame 142 to oscillate. Therefore, the second driving modules 146 have a relatively low demand for driving force. Based on this, the second driving modules 146 adopt the relatively small overall dimension as described above, so as to avoid increasing of a volume of the overall optical module 140 due to selecting of second driving modules with power and volumes beyond actual demands.

Moreover, because parts of the second driving modules 146 are disposed on the second frame 143 to become one of loads during driving of the first driving modules 145 and the second driving modules 146, reducing of a weight of the second driving modules 146 may also reduce rotational inertia of the loads driven by the first driving modules 145 and the second driving modules 146, thereby increasing reaction speeds of the first driving modules 145 and the second driving modules 146 during driving, and avoiding delay of transfer of the driving force due to the too large rotational inertia of the loads.

In addition, if the two driving modules with different demands for the driving force both adopt the same overall dimension as the known disposition mode, the two driving modules may provide different magnitudes of driving force respectively as expected only by conducting driving with currents with a relatively large current difference value respectively. In the embodiment, the first driving modules 145 and the second driving modules 146 with the different demands for the driving force adopt different overall dimensions respectively, and thus the first driving modules 145 and the second driving modules 146 may provide the different magnitudes of driving force respectively as expected by conducting driving with the currents with a relatively small current difference value respectively. For example, a difference value between a driving current value of the first driving modules 145 and a driving current value of the second driving modules 146 is less than 10%.

In detail, each of the first driving modules 145 includes a first driving element 145a and a second driving element 145b. Each of the second driving modules 146 includes a third driving element 146a and a fourth driving element 146b. The first driving elements 145a and the second driving elements 145b, for example, are coils and magnets respectively and disposed on the base 141 and the first frame 142 respectively, so as to drive the first frame 142 to oscillate in the reciprocating manner by means of magnetic force generated between the first driving elements 145a and the second driving elements 145b. The third driving elements 146a and the fourth driving elements 146b, for example, are coils and magnets respectively and disposed on the base 141 and the second frame 143 respectively, so as to drive the second frame 143 to oscillate in the reciprocating manner by means of magnetic force generated between the third driving elements 146a and the fourth driving elements 146b. In other embodiments, the coils and the magnets may be arranged interchangeably, and are determined according to an actual design.

In the embodiment, an overall dimension of the third driving elements 146a may be less than an overall dimension of the first driving elements 145a, and/or an overall dimension of the fourth driving elements 146b is less than an overall dimension of the second driving elements 145b, so as to make the overall dimension of the second driving modules 146 less than the overall dimension of the first driving modules 145.

Figure 3:
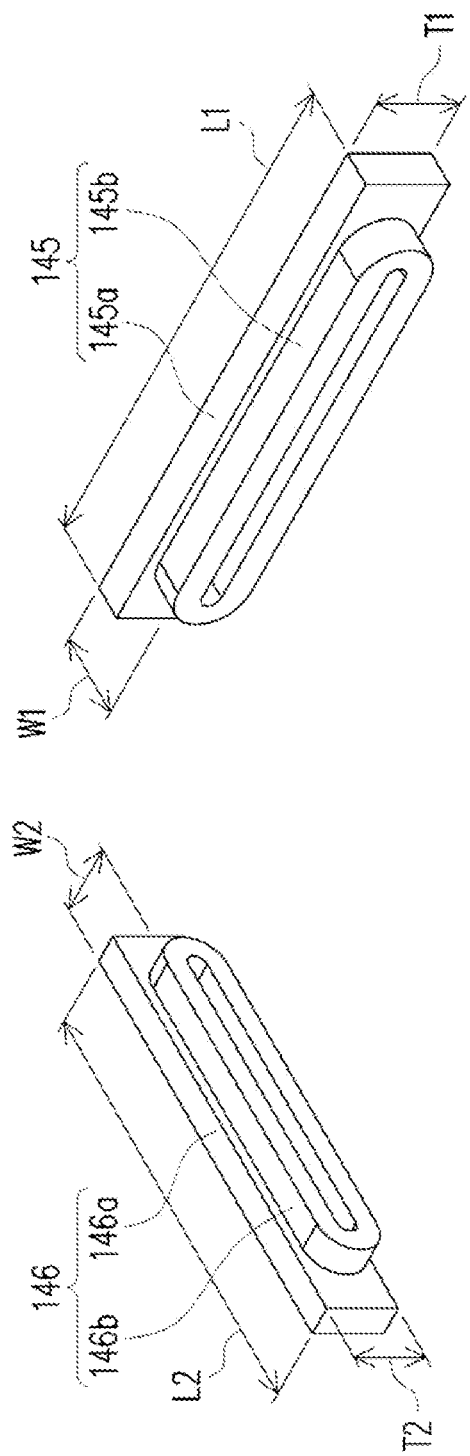
FIG. 3 is a partial perspective diagram of a first driving module and a second driving module of FIG. 2.
Figure 4:
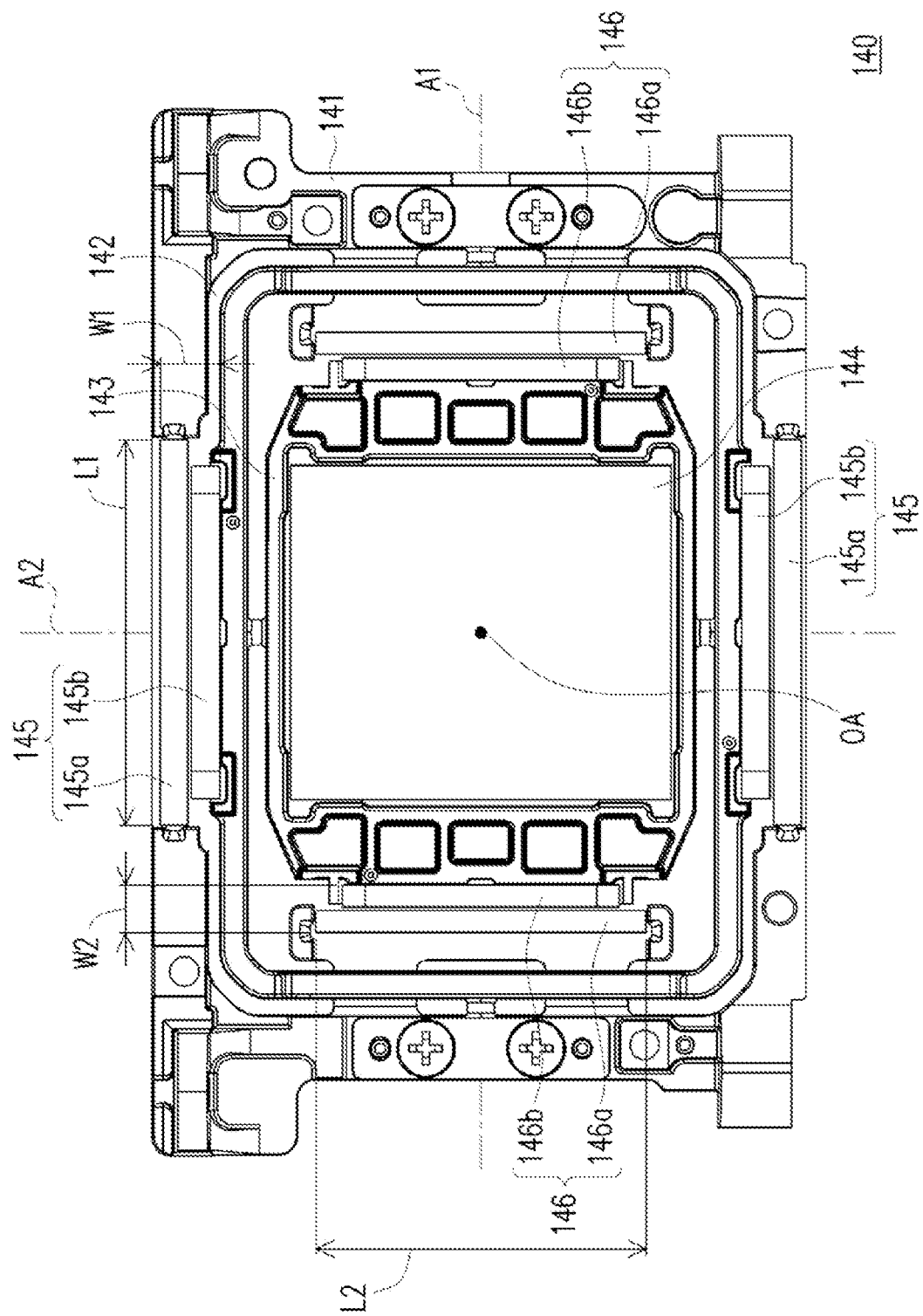
FIG. 4 is a top view of the optical module of FIG. 2.

The "overall dimension" is illustrated specifically below by means of accompanying drawings. FIG. 3 is a partial perspective diagram of the first driving module and the second driving module of FIG. 2. FIG. 4 is a top view of the optical module of FIG. 2. Referring to FIG. 3 and FIG. 4, in the embodiment, a dimension T2 of the second driving modules 146 in a direction parallel to the optical axis OA is less than a dimension T1 of the first driving modules 145 in the direction parallel to the optical axis OA. A dimension W2 of the second driving modules 146 in a direction parallel to the first rotating axis A1 is less than a dimension W1 of the first driving modules 145 in a direction parallel to the second rotating axis A2. A dimension L2 of the second driving modules 146 in the direction parallel to the second rotating axis A2 is less than a dimension L1 of the first driving modules 145 in the direction parallel to the first rotating axis A1. However, the disclosure does not limit this. In other embodiments, only one or two of the dimension of the second driving modules 146 in the direction parallel to the optical axis OA, the dimension of the second driving modules 146 in the direction parallel to the first rotating axis A1 as well as the dimension of the second driving modules 146 in direction parallel to the second rotating axis A2 are less than those of the first driving modules 145.

Based on the above, the embodiments of the disclosure at least have one of the following advantages or effects. In the optical module of the disclosure, the second driving modules with the relatively low demand for the driving force adopt the relatively small overall dimension. In this way, increasing of a volume of an overall device due to selecting of the second driving modules with the power and the volumes beyond the actual demands can be avoided. Moreover, because at least parts of the second driving modules are disposed on the second frame to become one of the loads during driving of the first driving modules and the second driving modules, reducing of the weight of the second driving modules can also reduce the rotational inertia of the loads driven by the first driving modules and the second driving modules, thereby increasing the reaction speeds of the first driving modules and the second driving modules during driving, and avoiding delay of transfer of the driving force due to the too large rotational inertia of the loads. In addition, the first driving modules and the second driving modules with the different demands for the driving force of the disclosure adopt the different overall dimensions respectively, and thus the first driving modules and the second driving modules can provide the different magnitudes of driving force respectively as expected by conducting driving with the currents with the relatively small current difference value respectively.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable a person skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by a person skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical module, comprising a first frame, a second frame, an optical element, a first driving module, and a second driving module, wherein
the first frame is configured to be connected to a base;
the second frame is connected to the first frame and located in the first frame;
the optical element is disposed in the second frame;
the first driving module is disposed between the base and the first frame, and configured to drive the first frame to oscillate around a first rotating axis; and
the second driving module is disposed between the first frame and the second frame, and configured to drive the second frame to oscillate around a second rotating axis, wherein the first rotating axis and the second rotating axis are perpendicular to an optical axis of the optical element, the first rotating axis is not parallel to the second rotating axis, and an overall dimension of the second driving module is less than an overall dimension of the first driving module.

2. The optical module according to claim 1, wherein a dimension of the second driving module in a direction parallel to the optical axis is less than a dimension of the first driving module in the direction parallel to the optical axis.

3. The optical module according to claim 1, wherein a dimension of the second driving module in a direction parallel to the first rotating axis is less than a dimension of the first driving module in a direction parallel to the second rotating axis.

4. The optical module according to claim 1, wherein a dimension of the second driving module in a direction parallel to the second rotating axis is less than a dimension of the first driving module in a direction parallel to the first rotating axis.

5. The optical module according to claim 1, wherein the first driving module comprises a first driving element and a second driving element, the second driving module comprises a third driving element and a fourth driving element, the first driving element and the second driving element are respectively disposed on the base and the first frame, the third driving element and the fourth driving element are respectively disposed on the base and the second frame, a dimension of the third driving element is less than a dimension of the first driving element, or a dimension of the fourth driving element is less than a dimension of the second driving element.

6. The optical module according to claim 1, wherein a difference value between a driving current value of the first driving module and a driving current value of the second driving module is less than 10%.

7. The optical module according to claim 1, wherein the optical module comprises two first driving modules, disposed between the base and the first frame, and the two first driving modules are respectively disposed on two opposite sides of the first frame.

8. The optical module according to claim 1, wherein the optical module comprises two second driving modules, disposed between the first frame and the second frame, and the two second driving modules are respectively disposed on two opposite sides of the second frame.

9. A projection device, comprising a light source, a light valve, a projection lens, and an optical module, wherein
the light source is configured to provide an illuminating beam;
the light valve is configured to convert the illuminating beam into an image beam;
the projection lens is configured to project the image beam; and
the optical module is disposed between the light valve and the projection lens, and comprises a first frame, a second frame, an optical element, a first driving module, and a second driving module, wherein
the first frame is connected to a base;
the second frame is connected to the first frame and located in the first frame;
the optical element is disposed in the second frame and located on a transmission path of the image beam;
the first driving module is disposed between the base and the first frame, and configured to drive the first frame to oscillate around a first rotating axis; and
the second driving module is disposed between the first frame and the second frame, and configured to drive the second frame to oscillate around a second rotating axis, wherein the first rotating axis and the second rotating axis are perpendicular to an optical axis of the optical element, the first rotating axis is not parallel to the second rotating axis, and an overall dimension of the second driving module is less than an overall dimension of the first driving module.

10. The projection device according to claim 9, wherein a dimension of the second driving module in a direction parallel to the optical axis is less than a dimension of the first driving module in the direction parallel to the optical axis.

11. The projection device according to claim 9, wherein a dimension of the second driving module in a direction parallel to the first rotating axis is less than a dimension of the first driving module in a direction parallel to the second rotating axis.

12. The projection device according to claim 9, wherein a dimension of the second driving module in a direction parallel to the second rotating axis is less than a dimension of the first driving module in a direction parallel to the first rotating axis.

13. The projection device according to claim 9, wherein the first driving module comprises a first driving element and a second driving element, the second driving module comprises a third driving element and a fourth driving element, the first driving element and the second driving element are respectively disposed on the base and the first frame, the third driving element and the fourth driving element are respectively disposed on the base and the second frame, a dimension of the third driving element is less than a dimension of the first driving element, or a dimension of the fourth driving element is less than a dimension of the second driving element.

14. The projection device according to claim 9, wherein a difference value between a driving current value of the first driving module and a driving current value of the second driving module is less than 10%.

15. The projection device according to claim 9, wherein the optical module comprises two first driving modules, disposed between the base and the first frame, and the two first driving modules are respectively disposed on two opposite sides of the first frame.

16. The projection device according to claim 9, wherein the optical module comprises two second driving modules, disposed between the first frame and the second frame, and the two second driving modules are respectively disposed on two opposite sides of the second frame.

\* \* \* \* \*